United States Patent [19]

Dunham

[11] Patent Number: 5,106,204
[45] Date of Patent: Apr. 21, 1992

[54] HIGH UNIT LOAD GAS BEARING

[76] Inventor: James L. Dunham, 216 Redwood Ave., Willits, Calif. 95490

[21] Appl. No.: 674,790

[22] Filed: Mar. 25, 1991

[51] Int. Cl.$^5$ .............................................. F16C 32/06
[52] U.S. Cl. ..................................................... 384/12
[58] Field of Search ................ 384/12, 114, 121, 117, 384/113

[56] References Cited

U.S. PATENT DOCUMENTS

| | | |
|---|---|---|
| 4,413,864 | 11/1983 | Phillips ................................. 384/12 |
| 4,486,105 | 12/1984 | Miyake et al. ....................... 384/114 |
| 4,953,989 | 9/1990 | Hooykaas ............................. 384/12 |

*Primary Examiner*—Lenard A. Footland

[57] ABSTRACT

An externally pressurized gas bearing with high unit load capacity is described. A raised bearing surface enclosing a recess is opposite a smooth bearing surface. The clearance gap across the space between the opposing bearing surfaces is systematically varied along the flow path controlling the flow cross sectional area. The gas flow within the bearing gradually increases in velocity to a maximum of Mach one at the exit of the clearance space. Methods of varying the clearance gap include the use of contoured rigid bearing surfaces, compliant bearing surfaces with fluid support, compliant bearing surfaces with tuned elastic support, and flexible bearing surfaces. Operating pressures of several hundred pounds per square inch or more are practical. The high load capacity of these gas bearings extends the application of gas bearings into areas now dominated by liquid lubricated bearings.

15 Claims, 6 Drawing Sheets

HIGH UNIT LOAD GAS BEARING

BACKGROUND OF THE INVENTION

1. Field of the Invention

The present invention generally relates to externally pressurized gas bearings.

2. Description of Prior Art

Externally pressurized gas bearings and the use of gas as a lubricant is widely known. The major advantages of gas lubrication over liquid lubrication are well understood. Due to the low viscosity of the gas lubricant, gas bearings have very low coefficients of friction. The stability of gas as lubricant, allows gas bearings to operate in both high and low temperature environments where liquids would solidify, vaporize, cavitate, or decompose. Gas lubricants frequently eliminate the need for bearing seals, particularly when air is the lubricant and the atmosphere is the reservoir. Gas bearings operate with very small clearances and thus maintain close tolerances.

The disadvantages of gas bearings are also recognized. Prior art teaches that because of the low viscosity and low damping in gas films, gas bearings have a reduced unit load carrying capacity. Generally gas bearings are larger and operate with very thin films compared to their liquid lubricated counterparts. The thin films in gas bearings demand very close control of machining tolerances and surface finishes.

The unit load capacity of gas bearings is pressure dependant. High unit loads require high gas pressures. Prior art teaches that high pressures produce either excessive gas flow or shock waves within the bearing. Hence gas bearings are thought to be incapable of operating at unit loads achievable by liquid lubricated bearings. Prior art has concentrated on avoiding shock waves by reducing pressures so as to maintain the flow in the lower subsonic velocity range which is adequately modeled by what is known as Viscous flow theory. Prior art teaches the desirability of maintaining low velocity gas flow within the bearing. There are many analytical and experimental studies on the phenomena of supersonic pressure depression in the feeding region of externally pressurized gas bearings. The deductive conclusion of this teaching is that raising the inlet pressure on a particular gas bearing has a negative effect on load capacity. However, in many such cases the supersonic flow and shock surfaces arise from the rapid expansion of the flow cross sectional area: That is; the geometry of the bearing inherently creates an area change dominated flow pattern.

Heretofore, prior art has failed to appreciate the advantages of controlling the geometrically induced flow cross sectional area expansion within a gas bearing. By controlling the flow cross sectional area within a bearing it is possible to have both high pressure and low flow rates. It is also possible to have gas velocities in the near sonic range producing large velocity pressure effects within the bearing.

Prior art includes a number of considerations of compressible flow effects which are relevant to a specific application. These include air hammer instability and lock up which are sometimes related to each other. Lock up can occur when the gas supply pressure multiplied by the area of the recess is less than the load. Avoiding lock up is crucial in many situations such as opposed pad thrust bearings and hydrostatic journal bearings.

The various theoretical models used in simple compressible gas flow are useful in designing and understanding high load gas bearings. The three most important factors altering the state of a flow stream are changes in area, wall friction, and the addition or removal of heat. Each effect has an associated simple theoretical model. Respectively they -are simple area change, simple friction, and stagnation temperature change. For a compressible gas these flow models are also known respectively as Isentropic flow, Fanno line flow, and Rayleigh line flow.

With respect to gas bearings the simple characteristics of these flow types can lead to great insight into how to optimize high pressure gas bearing design from a qualitative point of view.

Area change effects such as those which occur in converging and diverging nozzles are often the subject Isentropic gas flow analysis. Many elementary gas analysis deal with adiabatic supersonic and sub sonic flows within nozzles. This type of analysis can lead to the recognition that in gas bearings, area change effects are often the cause of shock waves. Such shock waves, as previously mentioned are generally deemed undesirable in gas bearings. Prior art has concentrated on avoiding such shock waves by reducing pressure and hence unit load capacity.

Figure 2:
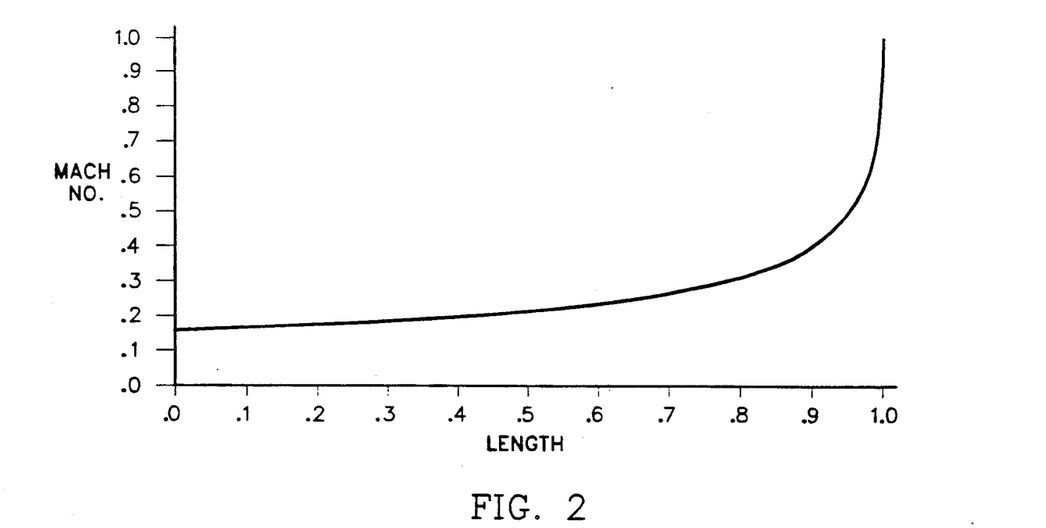
FIG. 2 is a plot of mach number verses flow path length for a typical Fanno line flow.
Figure 3:
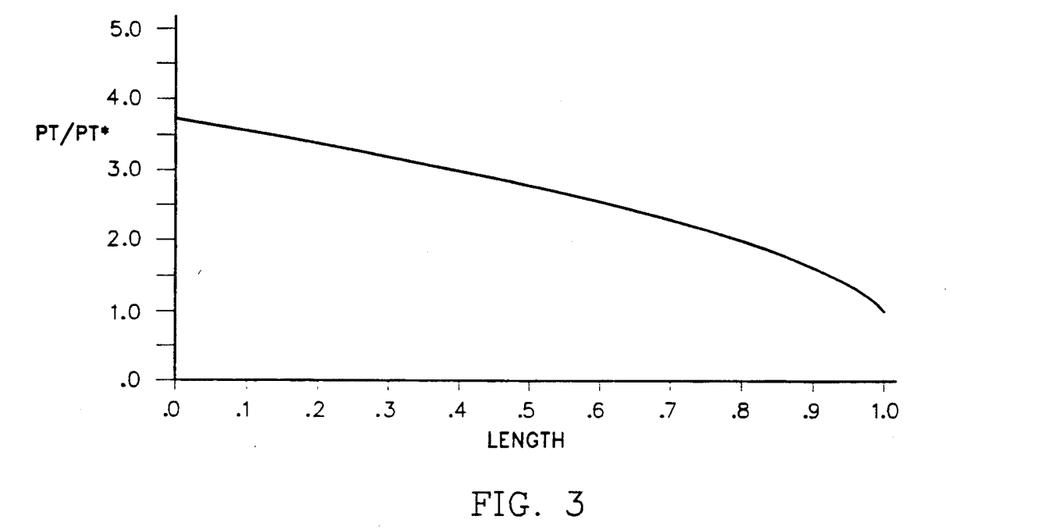
FIG. 3 is a plot of stagnation pressure verses flow path length for a typical Fanno line flow.

The small clearances within gas bearing often results in length to equivalent diameter ratio on the order of several hundred or more making friction a significant factor. Specifically designing a bearing to be friction dominated can be very desirable. In such a bearing, a Fanno line flow gas bearing, the gas enters the clearance space at a subsonic velocity and exits at a higher velocity, often near Mach 1.0, under the nominal design conditions. Thus, the gas velocity gradually rises as the gas proceeds across the bearing surface. The entering mach number can be estimated by complicated but workable methods once it is known that the pressure supplied is sufficient to force a shock exit. Or conversely, one can assume a shock exit and back calculate the entrance and exit conditions for a given entrance pressure. A key parameter of the physical system is known in the literature as $4fL/d$ where f is friction factor, L is a length, and d is the equivalent diameter of the flow path. For clearance space of thickness h, d would often be taken as approximately two times h. FIG. 2 shows a plot of the flow path length across a bearing land area verses Mach number for a typical gas bearing with a mach 1.0 exit. FIG. 3 shows a plot of flow path length verses the stagnation pressure ratio for a typical fanno flow gas bearing with constant flow cross sectional area. Such procedures are well known in gas dynamics and are useful in designing Fanno flow bearings.

Similarly, it can be appreciated the Rayleigh line flow models in combination with Fanno line flows are informative in understanding normal shock in constant area flows. In certain situations involving high heat transfer, such as combustion, the Rayleigh line flow models can dominate. Often in gas bearings this effect is modest and can be incorporated as a pertibation to the dominate flow solution. Qualitatively, the effects of Rayleigh line flow are similar to Fanno flow in that within a constant area sub sonic flow the addition of heat along the flow channel increases the velocity to a maximum of Mach one at the exit.

High pressure bearings have small clearances and are often limited by the expense of manufacturing surfaces of the required tolerances. The use of compliant bearing surfaces can greatly alleviate the necessity for expensive machining while providing close tolerances. However, the advantages of compliant surfaces in controlling the character of the flow within the bearing are not appreciated by prior art.

Another important consideration that establishes the lower limit on clearance space for gas bearing is the mean free path length which is measure of the minimum characteristic distance required for a gas to be behave as a continuum. The mean free path of air at typical supply pressures is less than a 0.000001 inch so that even at nominal clearances of 0.000001 inch the gas flows as a continuum. It is thus practical to operate fanno flow bearings at pressures of several hundred pounds per square inch or more.

It will be appreciated that Fanno line flow gas bearings offer significant increases in bearing load capacity and dynamic response over conventional gas bearings.

SUMMARY OF THE INVENTION, OBJECTS, AND ADVANTAGES

The present invention provides an improved gas bearing with high load capacity. The present invention is based on providing an improved bearing for gas lubricants. The improved bearing induces Fanno line dominated flow , or Fanno-Rayleigh dominated line flow between opposed bearing surfaces within a regulated gas bearing.

In certain situations it is often desirable to incorporate shock regulation into the bearing design of the present invention. Shock regulation refers to regulating flow rates with a standing.. shock wave. Shock regulated flows have the interesting property of a constant flow rate regardless of variations in pressure downstream of the shock surface so long as the downstream pressure remains below the critical pressure, which for air is about 53 percent of the upstream pressure. Shock regulation can be incorporated into the design of Fanno flow bearings by maintaining a shock exit along the exterior edge of the bearing surface.

Uniform cross sectional area and flow path lengths are important characteristics of a Fanno flow gas bearing. Supplying gas from a nozzle or small circular recess to a flat circular bearing surfaces is typical of prior art. This is an example of non uniform distribution. The induced radial flow cross sectional area expansion produces flow patterns dominated by area changes. This precludes the establishment of a shock surface at the exterior edge of the bearing surface unless the recess is very large. A technique included in the present invention for maintaining control over the flow cross sectional area is to narrow the clearance space along the flow channel in a systematic way. For example in the above circular bearing surface with constant clearance the flow cross section area is proportional to the radius. If the gap across the clearance space between the opposed bearing surfaces is made to vary inversely with the radius instead of being constant then the flow cross sectional area would be a constant value and thus independent the radius.

The present invention includes using various techniques to control cross sectional flow area by varying the clearance gap along the flow path. The conceptually simplest way to narrow the clearance gap along the flow path is to contour the bearing surface. Systematically contouring a rigid bearing surface usually requires great accuracy in dimensional control during manufacture and operation. However, the machining requirements can be relaxed by using a flexible or compliant bearing surface to control the cross sectional area. In fact the use of compliant bearing surfaces are an integral part of making high pressure gas bearings commercially viable by dramatically reducing machining costs. Additionally there is another important consideration of cross sectional flow area control with regards to compliant bearing surfaces for gas bearings. Compliant bearing surfaces can automatically induce cross sectional flow area control by varying the clearance space in response to local pressure variations within the bearing. For example, fluid supported compliant bearings are capable of supporting very average high unit loads and at the same time are highly compliant with regards to variations in the local loading across the bearing surfaces. Compliant bearing surfaces with these and other capabilities are included in the present invention In an externally pressurized gas bearing of the present invention the gas is usually filtered compressed air. It is typically routed to the bearing surface through openings in the bearing surfaces. Usually only one of the bearing surfaces opposed across the clearance space has openings for supplying gas, but it can be both. Gas supply pressure is regulated, usually a constant value. However, the present invention includes varying the pressure deliberately in order to enhance the bearing support or compensate for variations in loadings.

The present invention includes various combinations of inlet pressurization, orifice passage flow regulation, bearing surface geometry and exterior edge shock regulation, all in conjunction with flow cross sectional area control which produce Fanno line flow in the clearance space within a gas bearing.

Fanno flow gas bearings are able to operate at very high pressures and hence carry high unit loads. This single capability greatly expands the applications for which pressurized gas bearings are the best choice.

It would be very advantageous to have a high pressure gas bearing with high of unit load carrying capabilities without excessive gas flows. Such a bearing could replace liquid lubricated bearings in many applications providing the many advantages of gas lubrication.

Fanno flow bearings extend the applicability of gas lubricated bearings into regions now dominated by liquid lubricated bearings Often the liquid lubricated bearing which can be replaced with a high load gas bearing is lubricated with oil. Shifting to gas bearings from oil bearings has environmental consequences by reducing the demand for oil and the need to process the waste oil. This is an area of growing concern and expense which is directly addressed by the present invention.

DESCRIPTION OF THE PREFERRED EMBODIMENTS

Figure 1:
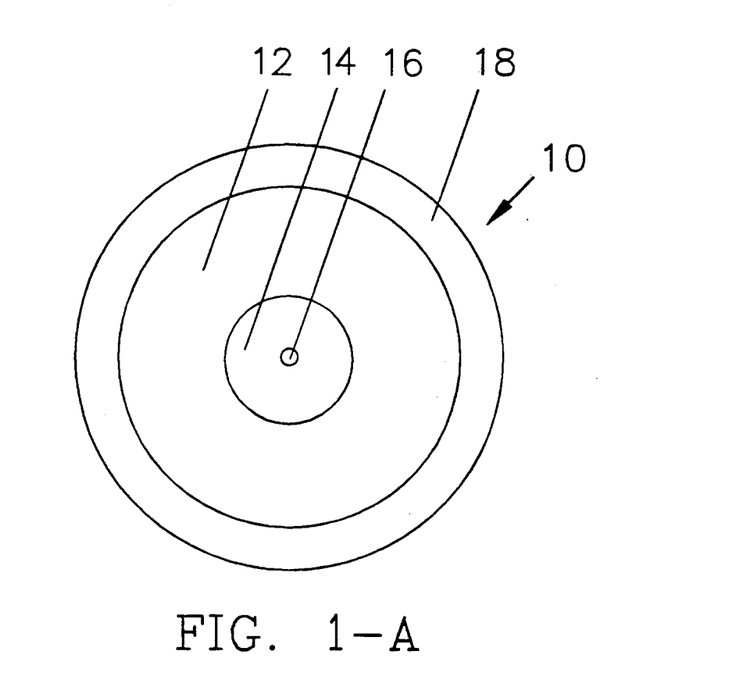
FIG. 1 is a section view and FIG. 1-A is a plan view of a bearing surface of the present invention which includes a fluid supported compliant bearing surface.

Referring to FIG. 1 and FIG. 1-A, a circular thrust bearing pad assembly (10) incorporating a compliant bearing sheet (26) is shown. The thin compliant bearing sheet (26) has a recess (14) a land area (12) and an exterior relief area (18). The thin bearing sheet (26) overlays a rigid bearing base (22). The supported bearing surface (28) is separated from the raised land area (12) by a clearance space (27). The distance across the clearance space (27) between the land area (12) surface and the supported bearing surface (28) is shown greatly exaggerated for clarity. A port (20) is provided through the bearing base connecting to the orifice passage (16) which opens to the center of the recess area (14). The bearing sheet (26) and the bearing base (22) enclose sectored cavities (24) which are typically filled with an inert liquid. Adjacent fluid cavities (24) are separated by seals (not shown). Also cavities can include raised ridges (not shown) which act as flow restrictors and deflection stops. In operation the supported bearing surface (28) is held away from the bearing sheet (26) land area (12) surface by forcing high pressure gas into the port (20). The gas passes through the orifice passage (16) losing a substantial portion of its pressure and emerging into the region between the recess (14) and the supported bearing surface (28). The gas then flows through the clearance space (27) approximately radially across the land area (12) accelerating to a maximum velocity of mach one at the exterior edge of the land area (12). The gas then emerges from the clearance space (27) at the exterior edge of the land area (12) with a sudden drop in pressure into the region between the exterior relief area (18) and the supported bearing surface (28) and finally emerges from the region adjacent the exterior relief area (18) into the surrounding space. The supported bearing surface (28) is smooth with gentle hill and valley variations in flatness typically less than the magnitude the nominal clearance. Typically the average clearance space (27) gap is less than 0.001 inch although this can vary. However, the important factor is that the nominal clearance between the bearing pad land area (12) and the supported surface (28) is a small ratio of the radial distance between the interior edge of the land area (12) and the exterior edge of the land area (12). The ratio of the nominal clearance to the radial distance is small enough so that the gas flow across the bearing land area (12) is friction dominated flow or Fanno flow. The primary support for the thin bearing plate (26) in the region of the land area (12) is from the pressure of the fluid in the sectored fluid cavities (24). The average pressure in the fluid varies with the total load upon the land surface (12) above the cavity. However the cavity (24) is filled with fluid so that the pressure is nearly uniform throughout the cavity (24) and the fluid thus exerts a uniform upward pressure on the underside the thin bearing sheet (26). The pressure in the clearance space (27) above the bearing sheet (26) decreases along the flow path of the gas. The pressure variation places uneven forces on the thin bearing sheet (26) causing the bearing sheet (26) to deflect. The clearance gap is thus greater in the region of the land area (12) adjacent the recess area (14) and less in the portion of the land area (12) adjacent the relief area (18). The differential loading causes a narrowing of the gap across the clearance space (27) along the flow path adjacent at land area (12). Basically the fluid pressure supports the supports the average load on the bearing sheet (26) and the thin bearing sheet (26) transfers the differential loading into the base (22). Of course the exact profile of the deflected bearing sheet (26) is a very complicated function of the dynamics of the gas flow stream, the opposed bearing surface dynamics, the imperfections and variations of the bearing surfaces, the material mechanical properties, and dimensions. However, it can be readily understood that the gas stagnation pressure will decrease along the flow path generally resulting in a narrowing of the clearance gap along the flow path.

The important factor to consider is that the thin bearing sheet (26) is deformed into a position in which the forces above and below the sheet (26) in combination with the cavity edge support forces and dynamic forces balance. The limiting case of a completely compliant bearing sheet (26) can be envisioned as acting similarly to a sectored membrane providing automatic flow cross sectional area control because of the nearly uniform pressure in the fluid cavity (24) and the dependance of the pressure on the gas side of the thin bearing sheet (26) upon the gas flow pattern. In actual operation there are also a number of transient fluctuations from the nominal conditions. However, the important aspects of proper operation are the action of the compliant bearing surface in controlling the character of the gas flow by automatically adjusting the clearance between the supported surface (28) and bearing land area (12) to maintain Fanno line dominated flow.

It will be appreciated that a gas bearing of the present invention is capable of supporting very high unit loads and is simple to manufacture.

Figure 4:
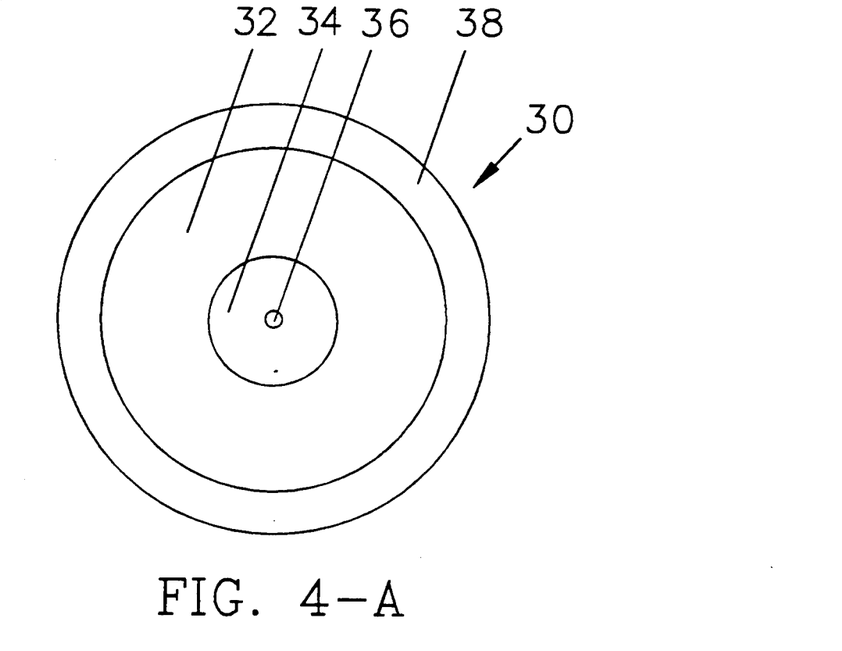
FIG. 4 is a section view and FIG. 4-A is a plan view of a bearing of the present invention which includes a rigid bearing with a contoured bearing surface.

Referring to FIG. 4 and FIG. 4-A, a circular thrust bearing pad (30) incorporating a contoured land area (32) is shown. The surface of the bearing pad (30) has a recess (34) a land area (32) and an exterior relief area (38). The land area (32) surface overlays a thick region of material which comprises a bearing base (42). A port (40) is provided through the bearing base (42) connecting to the orifice passage (36) which opens to the center of the recess area (34). In operation the supported bearing surface (48) is held a small distance away from the bearing pad by forcing high pressure gas into the port (40). The gas passes through the orifice passage (36) losing a substantial portion of its pressure and emerging into the region between the recess (34) and the supported bearing surface (48). Under nominal operating conditions the gas flows approximately radially across the land area (32) accelerating to a maximum velocity of mach one at the exterior edge of the land area (32) adjacent the exterior relief area (38). The gas then emerges from the land area (32) with a sudden drop in pressure into the region between the exterior relief area (38) and the supported bearing surface (48) and finally emerges from the region adjacent the exterior recess (38) into the surrounding space. The supported bearing surface (48) is smooth with variations in flatness (not shown) generally less than ten percent of the magnitude of the average nominal gap across the clearance space (37). The average gap across the clearance space (37) between the bearing pad land area (32) and the supported surface (48) is a small ratio of the radial distance between the interior edge of the land area (32) and the exterior edge of the land area (32). The ratio of the nominal clearance to the radial distance is small enough so that the gas flow across the bearing land area (32) is friction dominated flow or Fanno flow. The contour of the land area (32) compensates for the radially increasing circumference of the cross sectional flow area by narrowing the clearance space proportionally and thus maintaining a constant cross sectional area in the nominal position. In operation variations in the average clearance gap from the nominal position induce changes in the flow cross sectional which amplify the pressure response within the gas filled region. Thus the rigid contoured bearing pad (30) is very responsive, combining nominal position Fanno line flow with induced area change dynamic response. In actual operation there are also a number of transient fluctuations from the nominal conditions. However, the important aspects proper operation are the action of the contoured land area (32) bearing surface in controlling the character of the gas flow by amplifying the flow cross section area changes associated with variations in the distances between the supported bearing surface (48) and bearing land area surface (32). It will be appreciated that a bearing pad (30) of this design is capable of supporting very high unit loads and is very responsive.

Figure 5:
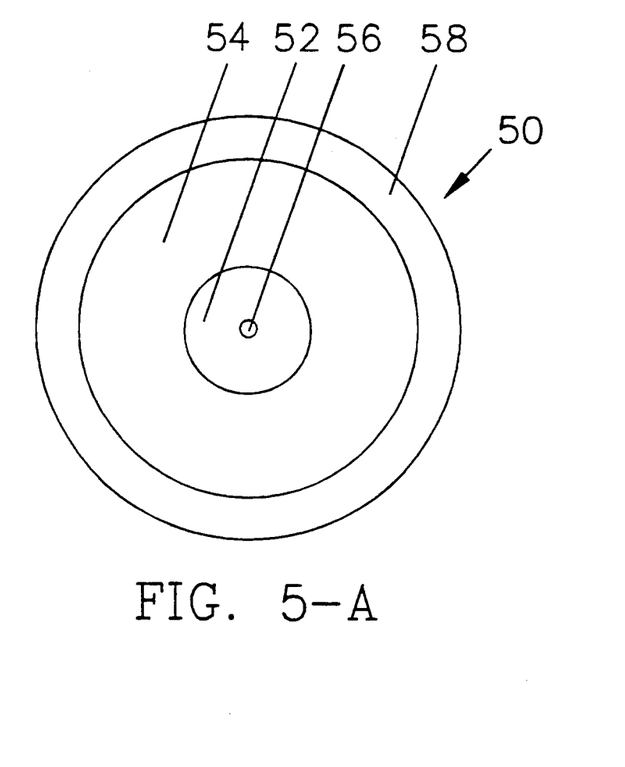
FIG. 5 is a section view and FIG. 5-A plan view of a bearing of the present invention which includes a flexible bearing surface with elastic support.

Referring to FIG. 5 and FIG. 5-A, a circular bearing pad assembly (50) incorporating a compliant bearing sheet (66) on an elastic base (64) is shown. The thin bearing sheet (66) has a recess area (52) a land area (54) and an exterior relief area (58). The thin bearing sheet (66) overlays a elastic bearing base (64). The perimeter of the thin bearing sheet overlays a rigid base (62). A tube (68) connects to the thin bearing sheet (66) providing a passage (60) that connects to the orifice passage (56) which opens to the recess area (52). In operation the supported bearing surface (55) is held a small distance away from the bearing pad by forcing high pressure gas into the passage (60). The gas passes through the orifice (56) losing a substantial portion of its pressure and emerging into the region between the recess (52) and the supported bearing surface (55). The gas flows through the clearance space (67) across the land area (54) accelerating to a maximum velocity of mach one at the exterior edge of the land area (54). The gas then emerges from the clearance space (67) with a sudden drop in pressure into the region between the exterior relief area (58) and the supported bearing surface (55) and finally emerges from the region adjacent the exterior recess (58) into the surrounding space. The supported bearing surface (55) is smooth with gentle hill and valley variations in flatness generally less than the order of magnitude the nominal clearance gap. The average nominal clearance gap between the bearing pad land area (54) and the supported bearing surface (55) is a small ratio of the radial distance between the interior edge of the land area (54) and the exterior edge of the land area (54). The ratio of the nominal clearance to the radial distance is small enough so that the gas flow, across the bearing land area (54) is friction dominated flow or Fanno flow. The primary support for the thin bearing plate (66) in the region of the land area (54) is from the elastic base (64) which adjoins the rigid base (62). The tube (68) is free to move with the elastic base (64). In operation the thin bearing plate (66) is deformed into a position in which the forces above and below the plate (66) in combination with the edge support forces and dynamic forces balance. The bearing plate (66) so deformed acts to automatically regulate flow cross sectional area control because the support from the elastic base (64) is a function of the deflection which will be greater opposite regions of high pressure. In actual operation there are also a number of transient fluctuations from the nominal conditions. Elastic base systems can be tuned by variation of elasticity, thickness, and density to obtain a particular critical velocity for a flexural wave in the thin bearing plate (66). This can be advantageous in systems where the bearing surface is moving at a known speed and hence the variations in the supported bearing surface traverse the bearing at that speed. By selecting a critical velocity about twice the known speed the response of the thin sheet (66) in mirroring local deformations in the supported bearing surface is enhanced. This assists the action of the compliant bearing surface in controlling the character of the gas flow by automatically adjusting the local clearance gap between the supported surface (55) and the bearing land area (54) to maintain Fanno line dominated flow. It will be appreciated that a bearing pad of this design is capable of supporting moderate unit loads and is simple to manufacture.

Figure 6:
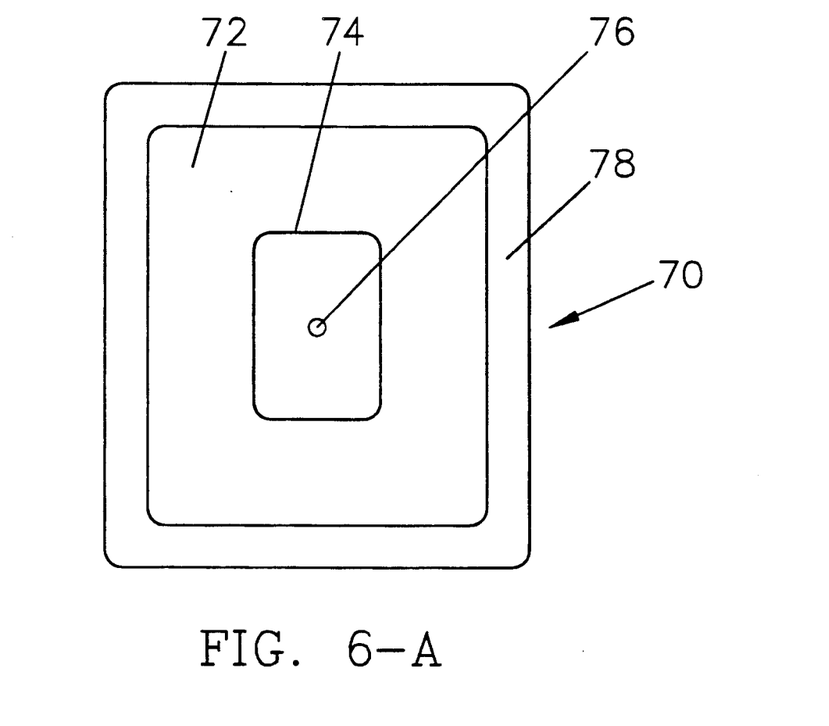
FIG. 6 is a section view and FIG. 6-A plan view of a bearing of the present invention which includes a flexible bearing surface with varying radial stiffness.

Referring to FIG. 6 and FIG. 6-A, a rectangular thrust bearing pad (70) incorporating a perimeter base (82) and a flexible plate (86) is shown. The surface of the flexible bearing plate (86) has a recess (74) a land area (72) and a tapered relief area (78). A tube (84) connects to the flexible bearing plate (86) providing a passage that (80) connects to the orifice passage (76) which opens to the center of the recess area (74). In operation the supported bearing surface (88) is held a small distance away from the bearing pad (70) land area (72) surface by forcing high pressure gas into the passage (80). The gas passes through the orifice (76) losing a substantial portion of its pressure and emerging into the region between the recess area (74) and the supported surface (88). The gas flows through the clearance space (87) across the land area (72) accelerating to a maximum velocity of mach one at the exterior edge of the land area (72). The gas then emerges from the clearance space (87) adjacent the land area (72) into a region of expanding cross sectional flow area adjacent the tapered relief area (78) and the across a standing shock wave with a sudden drop in pressure in the region between the tapered relief area (78) and the supported bearing surface and finally emerges into the surrounding space. The supported bearing surface (88) is smooth with variations in flatness generally less than the order of magnitude of the nominal clearance. The nominal clearance between the bearing pad land area (72) and the supported surface (88) is a small ratio of the radial distance between the interior edge of the land area (72) and the exterior edge of the land area (72). The ratio of the nominal clearance to the radial distance is small enough so that the gas flow across the bearing land area (72) is friction dominated flow or Fanno flow. The flexibility of the bearing plate (86) allows deflections under load since the tube (84) is free to move. Thus the bearing plate (86) surface shape adjusts to variations in loadings, but not in the same manner of the thin plate (26) fluid supported surface shown in FIG. 1. The bearing plate (86) is relatively thick so that significant deformations occur over a larger scale. The deflected bearing plate (86) functions similarly to the contoured land area (32) surface shown in FIG. 4. The region of the land area (72) adjacent the recess area (74) will be deflected farther from the supported surface (88) than the region of the land area (72) adjacent the tapered relief area (78). Thus under load from the pressurized gas the bearing plate (86) will assume a contour compensating for the radially increasing circumference of the cross sectional flow area by narrowing the clearance space (87). The shape of the contour under nominal loading as a function of radial distance depends on a number of parameters. The thickness of the bearing plate (86) is varied radially to the match the loading so as to produce the desired contour under load. The tapered relief area also (78) acts as diverging nozzle in operation. This feature is useful in enhancing the moment resisting capability of the bearing and can be incorporated previously discussed embodiments of FIGS. 1, 4, and 5 in place of a stepped relief area. In operation variations in the clearance from the nominal position induce changes in the flow cross sectional area which amplify the pressure response within the gas filled region. Thus the flexible plate bearing pad (70) is very responsive, combining nominal Fanno line flow with area change dynamic response. In actual operation there are also a number of transient fluctuations from the nominal conditions. However the important aspects proper operation are the action of the flexible bearing plate (86) in controlling the cross sectional flow area of the gas flow by automatically adjusting the clearance between the supported surface (88) and bearing land area (72). It will be appreciated that a bearing pad (70) of this design is capable of supporting high unit loads is very responsive, and is easy to manufacture.

Although the embodiments described and shown in FIGS. 1,4, and 5 have circular shaped bearing surfaces, shapes other than circular are included in the present invention. The various bearing surface shapes with which one or more of the cross sections shown in FIGS. 1, 4, 5, and 6 can be combined represent an embodiment of the present invention. These include a nearly trapezoidal shape, a rectangular shape, and sectored circular shape. Additionally an embodiment of the present invention includes a channel type recess enclosing a raised area which is often associated with squeeze film damping. The present invention includes the many obvious variations of shapes to which the basic elements of the sectional views of FIGS. 1, 4, 5, and 8 can be combined to create a fanno flow bearing.

The present invention also includes the application of the sectional views of FIGS. 1, 4, 5, and 6 applied to curved bearing surfaces.

Figure 7:
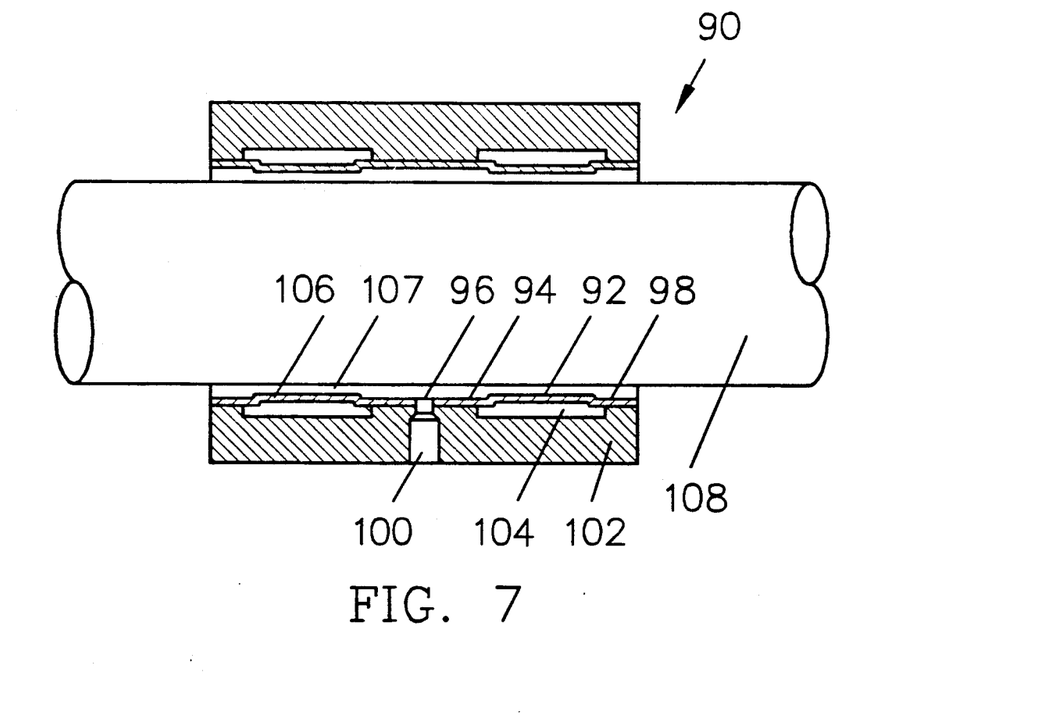
FIG. 7 is a journal bearing of the present invention with fluid supported compliant bearing surface.

Referring now to FIG. 7, an adaptation of FIG. 1 for supporting a shaft (108) is shown. The respective elements of the bearing assembly (90) are the supported shaft (108), the land area surface (92), the recess (94), the orifice passage (96), the relief area (98), the port (100), the bearing base (102), the fluid filled cavity (104), the thin bearing sheet (106), and the clearance space (107).

Figure 8:
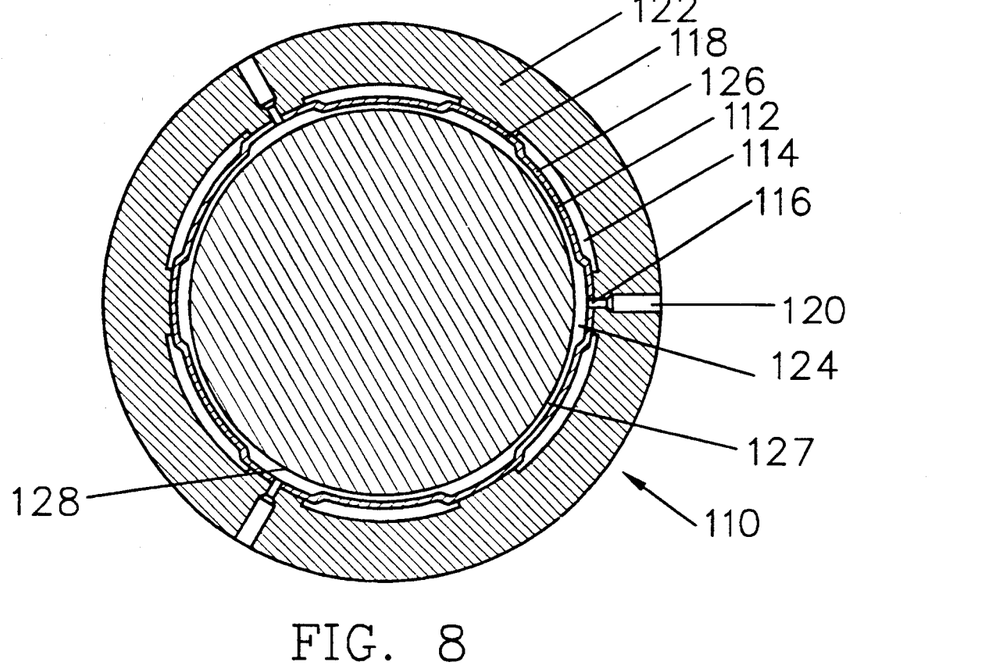
FIG. 8 is a sectored journal bearing of the present invention with fluid supported compliant bearing surface.

FIG. 8 shows a sectored journal bearing (110) arrangement included in the present invention which is also an adaptation of FIG. 1. The respective elements of the sectored journal bearing assembly (110), the supported shaft surface (128), the land area surface (112), the recess (124), the orifice passage (116), the relief area (118), the port (120), the bearing base (122), the fluid filled cavity (114), the thin bearing sheet (126), and the clearance space (127).

Fanno flow bearings extend the applicability of bearings using of gas a lubricant into regions now dominated by liquid lubricated bearings. Often the liquid lubricated bearing which can be replaced with a high load gas bearing is lubricated with oil. Shifting to gas bearings from oil bearings has environment consequences by reducing the demand for oil and the need to process the waste oil. This is an area of growing concern and expense which is directly addressed by the present invention.

The physics of compressible gas flow with moving boundaries are complicated. The brief physical explanation given above is believed to be accurate. However, it should not be construed as binding or complete.

What is claimed is:

1. An improved externally pressurized gas bearing including opposed bearing surfaces separated by a pressurized gas filled region with said gases flowing in said region between said bearing surfaces, said improvement including a centrally located recess enclosed by a raised bearing surface opposite a smooth bearing surface, said raised bearing surface and said opposite bearing surface separated by a clearance gap filled with said flowing gases; wherein said improvement includes a means to systematically vary the clearance gap between said raised bearing surface and said opposite bearing surface along the flow path of said flowing gases, said variation of said gap a means to regulate the cross sectional flow area of said gas flow.

2. An improved bearing as in claim 1 including one or more compliant fluid supported raised bearing surfaces, said compliant fluid supported raised bearing surfaces said means to vary said clearance gap between said raised bearing surface and said opposite bearing surface.

3. An improved bearing as in claim 1 including an exterior recess enclosing said raised surface area, said exterior recess comprising a relief area, said relief area comprising means to convey said gases freely to the atmosphere.

4. An improved bearing as in claim 1 including said raised bearing surface having a contour, said contour said means to vary said clearance gap between said raised bearing surface and said opposite bearing surface.

5. An improved bearing as in claim 1 including one or more compliant raised bearing surfaces supported on an elastic base, said compliant raised bearing surfaces supported on an elastic base said means to vary said clearance gap between said raised bearing surface and said opposite bearing surface.

6. An improved bearing as in claim 1 including one or more flexible raised bearing surfaces, said flexible raised bearing surface said means to vary said clearance gap between said raised bearing surface and said opposite bearing surface.

7. An improved bearing as in claim 1 wherein said variation of said gap produces an initially sub sonic gas flow in said clearance gap which gradually increases in velocity as said gas traverses said flow path reaching sonic velocity at the edge of said raised bearing surface with a shock exit from said clearance gap.

8. An improved bearing as in claim 1 wherein said variation of said gap maintains said flow cross sectional area approximately constant along said flow path.

9. An improved externally pressurized gas bearing including opposed bearing surfaces separated by a pressurized gas filled region with said gases flowing in said region between said bearing surfaces, said improvement including an exterior recess enclosing a raised bearing surface, said exterior recess comprising a relief area, said relief area a means to convey said gases freely to the atmosphere; wherein said raised bearing surface is opposite a smooth bearing surface, said raised bearing surface and said opposite bearing surface separated by a clearance gap filled with said flowing gases; wherein said improvement includes a means to systematically vary the clearance gap between said raised bearing surface and said opposite bearing surface along the flow path of said flowing gases, said variation of said gap a means to regulate the cross sectional flow are of said gas flow.

10. An improved bearing as in claim 9 including one or more contoured raised bearing surfaces, said contour said means to vary said clearance gap between said raised bearing surface and said opposite bearing surface.

11. An improved bearing as in claim 9 including one or more compliant fluid supported raised bearing surfaces, said compliant fluid supported raised bearing surfaces said means to vary said clearance gap between said raised bearing surface and said opposite bearing surface.

12. An improved bearing as in claim 9 including one or more compliant raised bearing surfaces supported on an elastic base, said compliant raised bearing surfaces supported on an elastic base said means to vary said clearance gap between said raised bearing surface and said opposite bearing surface.

13. An improved bearing as in claim 9 including one or more flexible raised bearing surfaces, said flexible raised bearing surface said means to vary said clearance gap between said raised bearing surface and said opposite bearing surface.

14. An improved bearing as in claim 9 wherein said variation of said gap produces an initially sub sonic gas flow in said clearance gap which gradually increases in velocity as said gas traverses said flow path reaching sonic velocity at the edge of said raised bearing surface with a shock exit from said clearance gap.

15. An improved bearing as in claim 9 wherein said variation of said gap maintains said flow cross sectional area approximately constant along said flow path.

* * * * *